United States Patent [19]

Abramson

[11] Patent Number: 4,737,109

[45] Date of Patent: Apr. 12, 1988

[54] BREAST CANCER DETECTION TRAINING DEVICE

[76] Inventor: Daniel J. Abramson, 7671 San Mateo Dr. East, Boca Raton, Fla. 33433

[21] Appl. No.: 21,255

[22] Filed: Mar. 3, 1987

[51] Int. Cl.⁴ .............................................. G09B 23/28
[52] U.S. Cl. ...................................................... 434/267
[58] Field of Search ........................................ 434/267

[56] References Cited

U.S. PATENT DOCUMENTS 4,001,951 1/1977 Fasse ..................................... 434/267
4,655,716 4/1987 Hoevel .

Primary Examiner—Gregory E. McNeill
Attorney, Agent, or Firm—Larson and Taylor

[57] ABSTRACT

A method and apparatus for use in training persons in breast cancer detection by manual examination is disclosed. The apparatus includes a device which simulates human breast tissue and a plurality of simulated lesions which are designed to represent specific lesions found in human breast tissue. The apparatus is employed to train a person in manual breast examination and also serves to train a person to recognize many different types of lesions found in human breast tissue.

17 Claims, 2 Drawing Sheets

BREAST CANCER DETECTION TRAINING DEVICE

FIELD OF THE INVENTION

The invention relates to a device for use in training persons in breast cancer detection by manual examination. More particularly, this device provides a means for training persons to distinguish among the many forms of lesions found in the human breast and thereby recognize which lesions are potentially dangerous and require immediate attention.

BACKGROUND OF THE INVENTION

The incidence of breast cancer ranks second only to skin cancer among the new cases of cancer in women. Breast cancer is also second only to lung cancer in the number of cancer fatalities of women in 1986. It is presently estimated that one of every eleven women will develop some form of breast cancer during her lifetime. The mortality rate resulting from breast cancer has not dramatically decreased in the past 35-40 years.

The primary methods of breast cancer detection are by mammography and physical examination. The earlier the cancer is discovered, and the smaller the tumor is, the greater is the chance of survival. It has been shown, that if tumors can be detected while they are under two centimeters in size, the cure rate would be increased by 50 percent and there would be a related reduction in the mortality rate. Therefore, the sooner that tumors are recognized, and the smaller the tumors are when they are recognized, the greater the cure rate.

Manual self-breast examination is a simple, worthwhile, atraumatic and non-hazardous method that is practiced worldwide. It has been shown that more frequent manual examinations increase the likelihood of detecting breast cancer, reduce the delay in treatment, detect tumors at an earlier clinical stage and smaller tumor size, and improve survival rates. The primary criticism of manual examination is that women do not examine their breasts properly. Several authors have stated that only 10-12 percent of women performing manual examination have correctly applied breast cancer detection methodology. It is well recognized, however, that at least 80 percent of all breast cancers are detected by women themselves. Manual breast examination is a viable and successful method of cancer detection and it is important that all women perform this monthly examination in a uniform manner. There are many methods of teaching manual breast examination. Such methods include films, lectures, mass media, brochures and instruction from health professionals. Of these methods, instruction from one's personal physician is the most important. Most women have difficulty in differentiating between harmful and harmless lesions and they have little or no knowledge of the various types of lumps which may occur in the breast. A tactile method of teaching women about the different types of tumors is essential for training in manual examination. This is true because 80 percent of tumors of the breast are benign. Therefore the ability to recognize the different types of tumors will allow women and health professionals to recognize the dangerous tumors.

Ortho Pharmaceutical Corporation markets a breast cancer detection teaching model in the form of a human female torso having simulated tumors embedded in the breast. This model has a more complex design and is far more expensive than the present invention. In addition, this model does not include removable simulated tumors which may be externally inspected and does not include a wide variety of lesions which represent the types of tumors that occur in the breast, as does the present invention.

Spenco Medical Corporation markets a breast cancer detection teaching model which comprises a plurality of simulated tumors within a gel-like substance shaped like a breast. The model further comprises a protective fabric cover which simulates skin. Again, this device includes no provision which would enable one to distinguish among benign solid tumors, cysts and malignant tumors.

U.S. Pat. No. 4,001,951 (Fasse) discloses the use of a plurality of lumps of varying hardness, size and configuration disposed within a foam rubber skin-like cover. This device only allows one to determine how various types of cancer growths feel upon manual examination. It does not provide any means for distinguishing between benign and malignant disease nor does it suggest utilizing other types of objects to simulate cysts and other benign thickenings.

U.S. Pat. No. 4,134,218 (Adams et al.) discloses a means for improving the pressure sensing techniques for manual breast examination. In the disclosed device, simulated tumors are made from various materials in different sizes, shapes and consistencies. This reference does not disclose any means for distinguishing between a cancer tumor and other types of benign thickenings.

Accordingly, it is the primary object of the present invention to provide a breast cancer detection training system which includes a means for training persons to recognize the various types of lesions which naturally occur in human breast tissue.

It is a further object of the present invention to provide a simple, inexpensive breast cancer detection training device for use in every physician's office, as well as for a home training device.

It is a still further object of the present invention to provide a breast cancer detection training device having removable simulated lesions which may be interchanged by the user at will.

These and other objects of the present invention will be apparent to one of ordinary skill in the art from the summary and detailed description which follow.

SUMMARY OF THE INVENTION

The present invention relates to a training device for use in teaching breast examination techniques that are employed in detecting human breast cancer. The device comprises a body of elastomerically yielding material and one or more lumps embedded in the body wherein the lump or lumps, due to its hardness, size and configuration, resembles a pre-determined type of lesion which is known to be found in human breasts such that a person may be trained to recognize different types of lesions.

In a preferred embodiment of the invention the various types of lumps which resemble lesions are removable and interchangeable.

The present invention also relates to a method of training a person to perform manual breast examination comprising the steps of providing the training device of the present invention, instructing a person on the technique of manual breast examination and requiring the person to manually examine the device to thereby familiarize the person with the technique of manual breast examination as well as teaching the person to recognize pre-determined types of lesions which may be found in human breast tissue.

The present invention provides a method and apparatus which is useful in teaching persons to recognize the various types of lesions found in human breast tissue. This is accomplished by providing a plurality of lumps, each of which resembles a pre-determined type of lesion, and allowing a person to manually examine each lump to thereby become familiar with the size, shape and configuration of different types of lesions.

DETAILED DESCRIPTION OF THE PREFERRED EMBODIMENTS

Figure 1:
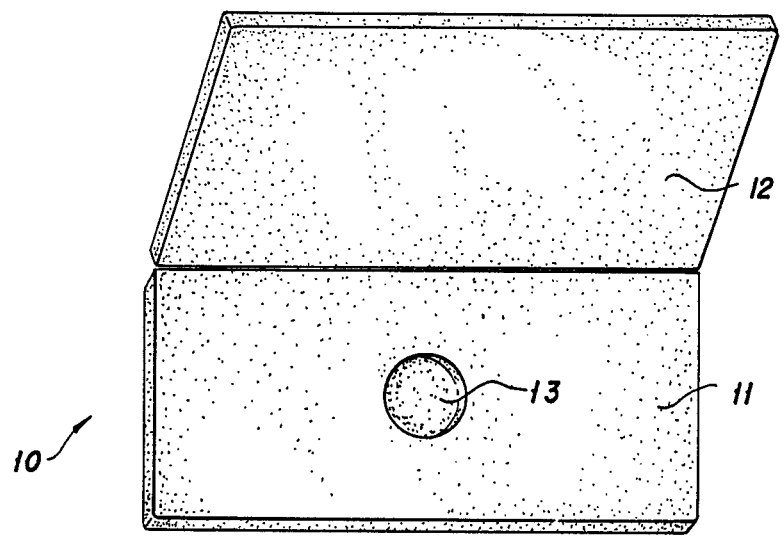
FIG. 1 is a plan view of the device according to the invention with the cover in the open position.
Figure 2:
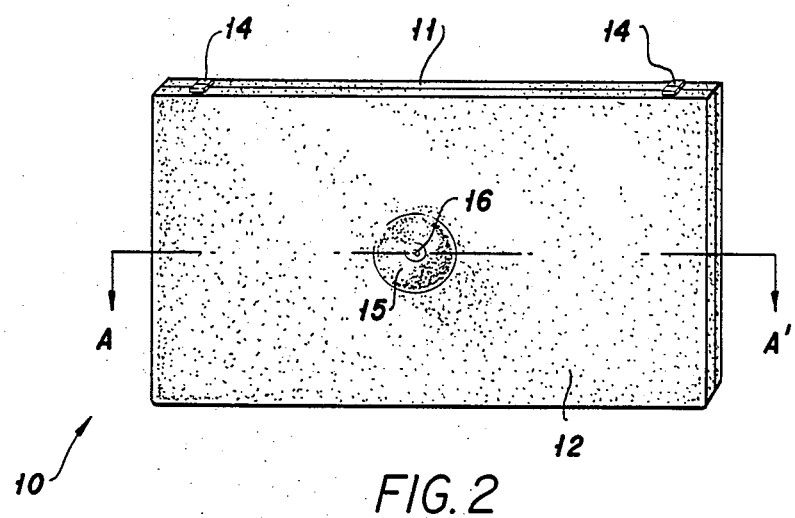
FIG. 2 is a top plan view of the device according to the invention with the cover in the closed position.
Figure 3:
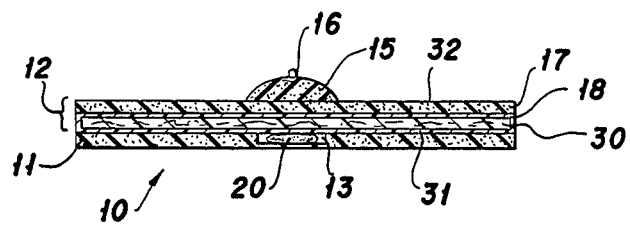
FIG. 3 is a sectional view along line A—A' of FIG. 2.

Referring to the drawings in detail, wherein like numerals indicate like elements, there is shown in FIG. 1 a preferred embodiment of the present invention. The breast cancer detection training device 10 includes a body 11 and a cover 12. Located at some point within the body 11 is one or more cavities 13. The cover 12 is hingedly attached to the body 11 by hinges 14 attached to one edge of the cover 12 and body 11 as shown in FIG. 2. The cover may be attached to the body by threads if desired. The cover 12 also includes a simulated areola 15, a simulated nipple 16, and is formed from two layers 17 and 18 as seen in FIG. 3.

The present invention also includes a plurality of lumps 20, each of which resembles a type of lesion. Among these lumps are a carcinoma 21, a fibroadenoma 22, a cyst 23, a cystic thickening 24, and a lipoma 25. Other lumps 20 (FIG. 3) may be used as long as they resemble lesions found in human breast tissue.

The body 11 of the device may be made from a soft material. More preferably the body 11 is fabricated from an elastic foam rubber or a similar plastic elastomer. The body 11 may be a sheet of soft material which, in a preferred embodiment is between ¼ and ½ inch thick and 4½" wide by 9½" long. The body 11 is adapted to receive at least one lump within cavity 13. The body 11 may have several cavities 13 therein such that several lumps selected from the group 20–25 may be used at a time. However, the single cavity version can be sufficient since the lumps are interchangeable at will. This gives the trainee the option of examining only selected lesions and also allows the trainee to actually pick up and inspect the lump as well and palpate the lump outside the simulated breast environment. In an alternative embodiment the device 10 may also have the lumps permanently fixed in the body 11. In such an alternative embodiment the lumps would not be interchangeable and consequently, there would be no way for the lumps to be accidentally misplaced.

The cover 12 has for its purpose to simulate the feel of human breast tissue. The trainee will, upon placement of the cover 12 over the body 11, be able to palpate the lumps under conditions similar to those encountered when palpating a human breast. The cover 12 may be flat or it may be shaped to represent a breast section containing a nipple 16 and an areola 15. The cover 12 may be a single layer of an elastic foam rubber or similar plastic elastomer. For a more realistic simulation though, it is desirable to have a two-layer cover 12 wherein the top outermost layer 17 is an elastic foam rubber or similar plastic elastomer and the inner layer 18 comprises silicone gel 30 housed in a sealed, enclosed membrane 31. The silicone gel layer 18 provides a more realistic simulation of normal breast tissue. The flow properties of gel material 30 are more like the consistency of human breast tissue than are foam rubber or similar plastic elastomers. The cover 12 may further include a skin-like plastic elastomer 32 which envelops the outermost surface of the top layer 18. This skin-like plastic 32 will impart to the cover 12 a texture that simulates actual skin such that a trainee may be exposed, on the device 10, to the most realistic simulation of actual breast tissue that is possible. This is important because the more accurately the device 10 represents actual breast tissue with lesions therein, the better the trainee will become at recognizing the lesions upon manual breast examination.

The cover 12 may be completely separate from the body 11 as long as the cover 12 is adapted to fit over the body 11 to provide a surface of simulated breast tissue between the embedded lumps and the trainee's hand. In the preferred embodiment the cover 12 is hingedly attached to the body 11 by hinges 14 in a manner which allows the cover 12 to be in a closed position as shown in FIG. 2 and an open position as shown in FIG. 1.

The invention also includes a plurality of lumps which are designed to represent various types of lesions found in human breast tissue. Each lump may be permanently embedded into the body 11 or more preferably the lumps are removable from the body cavity 13 in the body 11 and may be replaced or interchanged at will. In general, the lumps may be fabricated from any suitable material having the desired texture and hardness for the particular lesion to be represented. The lumps may be made from such things as durable silicone plastic elastomers; or pebbles, balloons, foam rubber, sponge, cloth, styrofoam and marbles as temporary expedients. The lumps are appropriately colored to simulate the color of actual lesions since, in an embodiment of the present invention, the lumps may be removed and visually inspected by the trainee.

Several different types of lumps are used in connection with the invention. These lumps represent malignant lesions as well as benign lesions which are found in human breast tissue. Among the different types of lumps which may be used with the present invention are a malignant carcinoma 21, fibro-adenoma, 22, cyst 23, cystic thickening 24 and lipoma 25.

Figure 4:
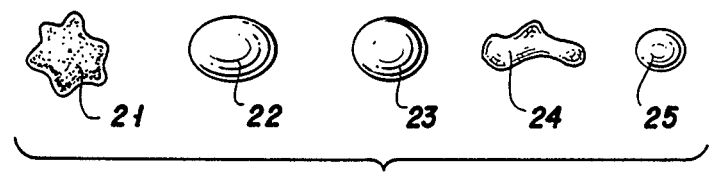
FIG. 4 is a sectional view of some of the lumps which resemble certain lesions which may be used in the present invention.

The malignant carcinoma 21 is grayish in color and firm. This carcinoma 21 is also irregularly shaped and has a beading or stellate form as shown in FIG. 4. Due to the firmness of this lesion the carcinoma 21 is formed from a hard material such as a plastic, pebble, or the like. When the trainee is being acquainted with this lesion she will be instructed that this lesion is frequently associated with retraction and dimpling and that it is usually not associated with pain.

The fibro-adenoma 22 represents a benign lesion that occurs primarily in younger women. In general this fibro-adenoma 22 will be firm, round, smooth and movable to some extent. The fibro-adenoma 22 will have a whitish-yellow color and may be fabricated from plastic, a pebble, a marble or the like.

The cyst 23 represents a benign lesion which is usually found in menstruating females. The cyst 23 is represented by a smooth, round object that contains air or fluid. A cyst 23 is bluish in color. The cyst 23 can be a small balloon made of a material which is considerably stronger than commercial balloon material such that the cyst 23 will last a long time. A suitable plastic elastomer is preferably used to fabricate this object.

The cystic thickening 24 represents another form of benign lesion found in human breast tissue. This cystic thickening 24 is represented by an ill-defined mass which is relatively soft. A cystic thickening 24 is represented by a white object and may be fabricated from plastic elastomer, spongy material, styrofoam, or the like. The trainee is instructed that this type of lesion may be tender to palpation and usually enlarges just prior to a woman's period.

Yet another simulated benign lesion is a lipoma 25 which represents a conglomerate of fatty cells. The lipoma 25 is soft, round, smooth, homogeneous and may occur at any age. The lipoma 25 is represented by a yellowish object and may be made from plastic, cloth or the like.

It is to be understood that the foregoing lumps are merely representative examples of the possible lumps that can be used in connection with the present invention. Any lesion that is found in human breast tissue may be represented by a lump. Other possible lesions include but are not limited to, mammary duct ectasia, abscesses, papillomas and inflammation.

Figure 5:
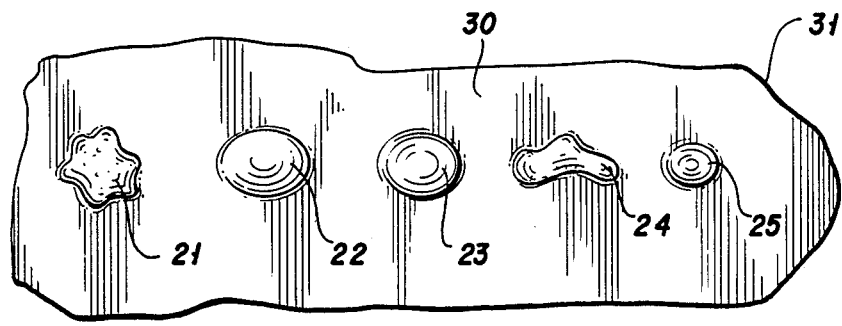
FIG. 5 is a sectional view of an alternative embodiment of the present invention.

An alternative embodiment of the invention is depicted in FIG. 5. In this embodiment the lumps 21-25 are permanently embedded in a mass of silicone gel 30 which is enclosed by a sealed, enclosed membrane 31. The silicone gel 30 gives this embodiment a realistic feel that simulates human breast tissue. Moreover, this embodiment will be inexpensive and the lumps 21-25 will not be removable and therefore cannot be misplaced. The membrane 31 may also be a skin-like elastomer which imparts the characteristics of simulated skin to this embodiment.

In use a physician demonstrates and explains the various lumps and clinical characteristics of each lump to illustrate the feel of these lesions. Preferably, a printed form is given to each trainee to explain the steps of manual breast examination as well as illustrating the clinical characteristics of various tumors. Once the lesions and clinical characteristics have been explained the trainee is required to palpate the lumps 20-25 through the cover 12 or in the case of the alternative embodiment of FIG. 5, through the silicone gel 30. On palpation, the lumps will impart to the patient the appropriate amount of pressure to be used for manual examination, as well as the characteristic feel of each type of lesion found in breast tissue. As a result, the patient will acquire a distinct knowledge of what is to be looked for during manual examination and also the ability to recognize and distinguish among the various types of lesions. This training is sufficient to impart to the trainee the knowledge that the American Cancer Society recommends should be given to all women. The invention may also be used as a home kit, along with proper instruction, for women to become familiar with manual breast examination.

The present invention has been described in detail with reference to certain specific embodiments thereof. Many modifications and variations of the present invention are possible without departing from the spirit thereof. Accordingly, the scope of the invention is to be defined by the claims appended hereto.

What is claimed is:

1. A training device for use in teaching manual breast examination techniques employed in detecting human breast cancer comprising:
   a body of an elastomerically yielding material, and
   at least one lump embedded in said body,
   said lump due to its hardness, size and configuration resembling a pre-determined type of lesion which is known to be found in human breasts such that a person may be trained to recognize different types of lesions.

2. A device according to claim 1 wherein said body comprises at least one cavity into which said lumps may be removably inserted.

3. A device according to claim 2 further comprising a cover of an elastomerically yielding material which may be placed over said body, said cover simulating human breast tissue.

4. A device according to claim 3 wherein said cover is hingedly attached to said body in a manner which permits said cover to assume an open position which exposes said body and a closed position which covers said body.

5. A device according to claim 2 wherein said body is fabricated from foam rubber or a suitable polymer which simulates the consistency of breast tissue.

6. A device according to claim 4 wherein said cover comprises foam rubber.

7. A device according to claim 5 wherein said cover further comprises a plastic elastomer which simulates human skin.

8. A device according to claim 7 wherein said cover is shaped to simulate a human breast.

9. A device according to claim 6 wherein said cover further comprises a portion fabricated from silicone gel which simulates the feel of normal breast tissue.

10. A device according to claim 3 wherein said cover comprises silicone gel.

11. A device according to claim 2 wherein said body comprises silicone gel.

12. A device according to claim 1 wherein said lumps resemble lesions- comprising carcinomas, fibroadenomas, cysts and lipomas.

13. A device according to claim 1 wherein said body comprises silicone gel.

14. A device according to claim 12 wherein said lumps are permanently embedded in said body.

15. A method of training a person to perform manual breast examination comprises the steps of:
   providing a training device for use in teaching manual breast examination techniques employed in detecting human breast cancer comprising a body of an elastomerically yielding material, and at least one lump embedded in said body, said lump due to its hardness, size and configuration, resembling a pre-determined type of lesion which is known to be found in human breasts such that a person may be trained to recognize different types of lesions,
   instructing a person on the technique of manual breast examination, and
   requiring the person to manually examine said device to thereby familiarize the person with the technique of manual breast examination as well as teaching the person to recognize at least one predetermined type of lesion which is found in human breast tissue.

16. A method in accordance with claim 15 wherein said device includes a means for manually interchanging said lumps, said method further comprising the steps of:
removing said lump from said body, and
inserting another lump resembling a different predetermined type of lesion to thereby teach a person to recognize a plurality of different types of lesions which are found in human breast tissue.

17. A training device for use in teaching manual breast examination techniques employed in detecting human breast cancer comprising,
a body of an elastomerically yielding material,
at least one recess in said body,
a plurality of lumps made of different materials and of different colors to simulate lumps within the human body selected from the group comprising carcinomas, fibro-adenomas, cysts, cystic thickenings and lipomas,
said lumps being adapted to be received with said recess, and
a cover for said body simulating human skin whereby the lump disposed within the recess may be felt through said cover.

* * * * *